J. E. LEMOINE AND C. W. O'NEAL.
WHISTLE OPERATING CONNECTION.
APPLICATION FILED MAR. 28, 1921.
1,392,773. Patented Oct. 4, 1921.
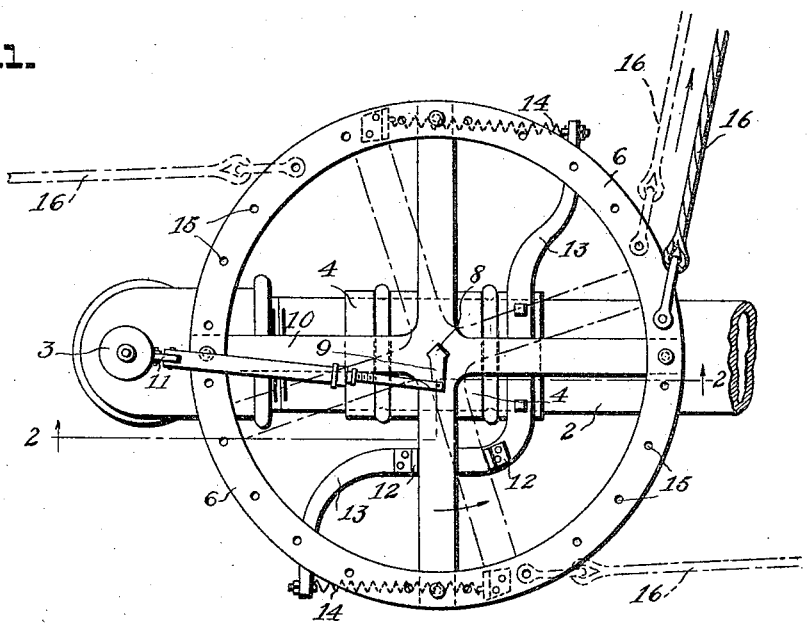
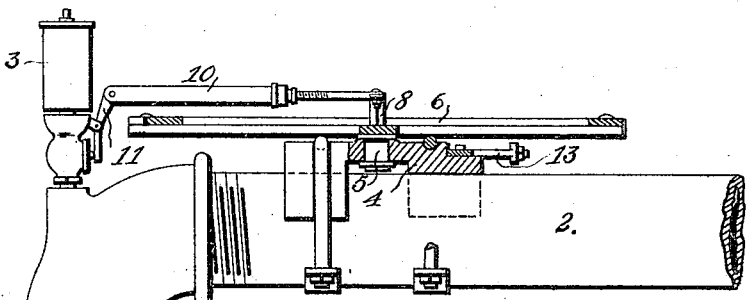
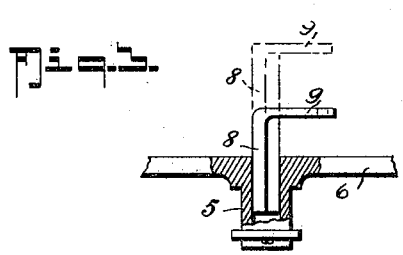
Inventor
Joseph E Lemoine
Clement W. O'Neal.
By Fred G Dieterich
Attorneys

UNITED STATES PATENT OFFICE.

JOSEPH E. LEMOINE, OF VANCOUVER, AND CLEMENT W. O'NEAL, OF UNION BAY, BRITISH COLUMBIA, CANADA.

WHISTLE-OPERATING CONNECTION.

1,392,773.  Specification of Letters Patent.  Patented Oct. 4, 1921.

Application filed March 28, 1921. Serial No. 456,229.

*To all whom it may concern:*

Be it known that we, JOSEPH E. LEMOINE and CLEMENT W. O'NEAL, citizens of the Dominion of Canada, residing at Vancouver and Union Bay, respectively, in the Province of British Columbia, Canada, have invented certain new and useful Improvements in Whistle-Operating Connections, of which the following is a specification.

This invention relates to a means for operating the signal whistle of a logging donkey engine by means of the wire from the various locations on the line of haul.

As it is obviously inconvenient to lead the whistle signal wire along the line of haul, the line of that wire may approach the engine at any angle from the position of the engine and consequently at an angle to the plane of movement of the whistle lever.

In the invention, which is the subject of this application, the whistle is actuated in one definite direction from a wheel rotatably mounted adjacent the whistle and the rim of the wheel is provided with means for connecting the signal wire to it at any part of its circumference that the wire may be approximately tangential to the wheel from the desired line of approach.

The device is fully described in the following specification, reference being made to the drawings by which it is accompanied, in which:

Figure 1 is a plan of the device showing its relation to the steam pipe and whistle.

Fig. 2 is a sectional elevation on the line 2—2 in Fig. 1.

Fig. 3 is a detail to an enlarged scale of the hub of the wheel showing the axial lever stem, and Fig. 4 shows a modification wherein the wheel lever is directly applied to the whistle valve stem.

In these drawings 2 represents the steam pipe from the boiler to the engine, and 3 the whistle secured to the steam pipe and in communication therewith. On the horizontal portion of this steam pipe 2 adjacent the whistle is secured a seat member 4 having an apertured boss adapted to receive the downwardly projecting hub 5 of a wheel 6 which is retained within its bearing in the member 4 by a washer and pin, leaving the wheel free to rotate.

The hub 5 of the wheel is axially apertured to receive a square stem 8, on the upper end of which is a short lever 9, the free end of which is connected by a lengthwise adjustable rod 10 to the lever 11 of the whistle. Partial rotation of the wheel 6 will thus operate the lever to sound the whistle.

Rotational movement of the wheel 6 is limited to what is necessary to actuate the whistle valve by stops 12 secured to any convenient fixed part to engage one of the radial spokes of the wheel 6. In the drawing the stops 12 are shown as secured on an arm 13 secured across the seat member 4 and extending both ways to adjacent the rim of the wheel. From the ends of this arm 13 springs 14 are connected to downward projections from the rim of the wheel 6, which springs are designed to retain the wheel at the backward limit of its movement.

The rim of the wheel has a series of apertures 15 around it to any one of which the signal wire 16 may be connected by a light shackle and bolt.

The wheel with the apertures around its circumference enables the signal wire 16 to be tangentially connected to operate the whistle valve from any direction of approach, which is a convenience as it is frequently inconvenient to conduct the signal wires along the line of the hauling rope from the donkey engine.

The square stem socketed in the axial aperture of the wheel hub enables a stem of different height to be substituted where necessary.

Fig. 4 shows a modification wherein the connecting rod 10 is dispensed with, and the wheel lever 9 is applied directly to the valve stem of the whistle from which the lever 11 has been removed. In this case the rotational mounting 4 of the wheel 6 is brought close to the connection of the whistle 3 to the steam pipe 2, one of the arms of the wheel 6 being removed to permit the rotational movement of the wheel necessary to operate the whistle valve.

A convenient means is thus provided for connecting the whistle signal wire to the whistle of a logging donkey engine in a manner that enables the whistle to be satisfactorily actuated from any angle of approach of the signal wire, and that will limit the pull delivered to the whistle lever irrespective of what is imparted to the signal wire.

Having now particularly described our invention, we hereby declare that what we claim as new and desire to be protected in by Letters Patent, is:

1. A whistle operating means for a logging donkey engine or the like, said means comprising a wheel rotatably mounted adjacent the whistle, the rim of which wheel has provision at intervals apart for connection of the whistle signal wire to it, means for limiting rotational movement of the wheel, means adjacent the hub of the wheel for actuating the whistle valve, and a spring normally holding the wheel in the out of action position.

2. A whistle operating means for a logging donkey engine or the like, said means comprising, a wheel rotatably mounted adjacent the whistle, the rim of which wheel has provision at intervals apart for connection of the whistle signal wire to it, means for limiting rotational movement of the wheel, means for connecting the wheel adjacent the hub to the lever of the whistle valve, and means for normally holding the wheel in the out of action position.

3. A whistle operating means for a logging donkey engine or the like, said means comprising, a wheel rotatably mounted adjacent the whistle, the rim of which wheel has provision at intervals apart for connection of the whistle signal wire to it, means for limiting rotational movement of the wheel, a lever having a square stem to socket in an axial aperture of the wheel hub, a rod connecting the hub lever of the wheel to the lever of the whistle valve, and a spring normally holding the wheel in the out of action position.

4. A whistle operating means for a logging donkey engine or the like, said means comprising, a seat member adapted for attachment to the steam pipe of the engine adjacent the whistle, a wheel rotatably mounted in the seat member, the rim of which wheel is apertured at intervals apart for connection to it of the whistle signal wire, stops limiting rotational movement of the wheel, a lever having a stem adapted to fit an axial square aperture in the hub of the wheel, and a lengthwise adjustable rod connecting the end of the hub lever to the lever of the whistle valve.

In testimony whereof we affix our signatures.

JOSEPH E. LEMOINE.
CLEMENT W. O'NEAL.